United States Patent [19]

Khare

[11] Patent Number: 5,306,685
[45] Date of Patent: Apr. 26, 1994

[54] ABSORPTION OF HYDROGEN SULFIDE AND ABSORBENT COMPOSITION THEREFOR

[75] Inventor: Gyanesh P. Khare, Bartlesville, Okla.

[73] Assignee: Phillips Petroleum Company, Bartlesville, Okla.

[21] Appl. No.: 58,586

[22] Filed: May 7, 1993

Related U.S. Application Data

[62] Division of Ser. No. 874,908, Apr. 28, 1992, Pat. No. 5,244,641.

[51] Int. Cl.$^5$ ............................................. B01J 21/00
[52] U.S. Cl. ................................... 502/253; 502/259; 502/329; 502/335
[58] Field of Search ................... 423/138, 326, 328.1; 502/253, 259, 329, 335

[56] References Cited

U.S. PATENT DOCUMENTS

| | | | |
|---|---|---|---|
| 2,551,905 | 5/1951 | Robinson | 23/2 |
| 2,747,968 | 5/1956 | Pigache | 23/178 |
| 4,044,114 | 8/1977 | Dezael et al. | 423/574 |
| 4,088,736 | 5/1978 | Courty et al. | 423/230 |
| 4,626,420 | 12/1986 | Usui et al. | 423/326 |
| 4,680,806 | 9/1987 | Schorfheide | 423/230 |
| 4,729,889 | 3/1988 | Flytani-Stephanopoulos et al. | 423/593 |
| 4,732,888 | 3/1988 | Jha et al. | 502/406 |
| 4,769,045 | 9/1988 | Grindley | 48/202 |
| 4,857,285 | 8/1989 | Gal | 423/230 |
| 4,895,824 | 1/1990 | Kim | 502/300 |
| 4,916,105 | 4/1989 | Rieck et al. | 502/303 |
| 4,990,318 | 2/1991 | Kidd | 423/230 |
| 5,045,522 | 9/1991 | Kidd | 502/405 |
| 5,077,261 | 12/1991 | Schubert | 502/408 |
| 5,094,996 | 3/1992 | Kidd | 502/405 |

FOREIGN PATENT DOCUMENTS

| | | | |
|---|---|---|---|
| 55-61926 | 5/1980 | Japan . | |
| 63-134028 | 6/1988 | Japan | 423/231 |
| 1112005 | 5/1968 | United Kingdom | 423/326 |

OTHER PUBLICATIONS

Tamhankar et al., "Mixed-Oxide Sorbents for High-Temperature Removal of Hydrogen Sulfide", Ind. Eng. Chem. Process Des. Dev., Feb. 1986, vol. 25, pp. 429–437.

Ayala et al., "Enhanced Durability for High-Temperature Desulfurization Sorbents for Moving-Bed Applications", 199th Am. Chem. Soc. National Meeting, Div. of Fuel Chem., Boston, Apr. 1990, pp. 120–127.

Excerpt of Chapter on Group IIB Metals by B. M. Aylett in "Comprehensive Inorganic Chemistry", Edited by J. C. Baylar Jr. et al. vol. 3, 1973, Pergamon Press, pp. 220–223.

*Primary Examiner*—Gary P. Straub
*Assistant Examiner*—Timothy C. Vanoy
*Attorney, Agent, or Firm*—K. K. Brandes

[57] ABSTRACT

Hydrogen sulfide is removed from a gas by contacting it with an absorbent composition consisting essentially of a mixed oxide of iron, zinc and nickel and an inorganic binder.

18 Claims, No Drawings

ABSORPTION OF HYDROGEN SULFIDE AND ABSORBENT COMPOSITION THEREFOR

This application is a division of U.S. patent application Ser. No. 874,908, filed Apr. 28, 1992, now U.S. Pat. No. 5,244,641.

BACKGROUND OF THE INVENTION

In one aspect, this invention relates to a process for removing hydrogen sulfide from gases streams. In another aspect, this invention relates to an effective $H_2S$ absorbent material.

The removal of sulfur or compounds thereof from gases may be desirable or necessary for a variety of reasons. If a gas is to be burned as a fuel or released into the atmosphere as a waste stream, removal of sulfur compounds from the gas may be necessary to meet the sulfur emission requirement set by various air pollution control authorities. If a gas is to be employed as a feed for an industrial process, removal of sulfur compounds from the gas is often necessary to prevent the poisoning of sulfur sensitive catalysts or to satisfy other process requirements.

A variety of processes employing regenerable, solid contact materials are known for removing sulfur from gases when the sulfur is present as hydrogen sulfide. U.S. Pat. Nos. 5,045,522 and 4,990,318 disclose compositions comprising a zinc compound, alumina and a nickel compound, said compositions being effective for hydrogen sulfide absorption. The spent absorbent compositions can be regenerated to the original absorbing composition state in the presence of oxygen. Even though these compositions are quite effective as $H_2S$ absorbents, there is an ever present need to develop new absorbent compositions which exhibit specific advantages over known compositions.

SUMMARY OF THE INVENTION

It is an object of this invention to provide an effective absorbent composition for removing hydrogen sulfide from gases. It is another object of this invention to provide a process for the removal of hydrogen sulfide from gases employing the absorbent composition of this invention. Other objects and advantages will be apparent from the detailed description and the appended claims.

The present invention provides an effective $H_2S$ absorbent composition which consists essentially of (i) more than about 20 weight percent of a mixed oxide of iron, zinc and nickel, and (ii) and at least one inorganic binder selected from the group consisting of alumina and silica as the remainder. Preferably, the above-described absorbent composition is prepared by a method comprising the steps of mixing iron oxide (preferably $Fe_2O_3$), zinc oxide, $Al_2O_3$ and/or $SiO_2$, optionally an effective processing aid, and a sufficient amount of a dilute aqueous acid solution to prepare a pasty, shapable mixture of the above ingredients; shaping the obtained pasty, shapable mixture; drying the obtained shaped particles; calcining the dried, shaped particles at a temperature of about 600°–900° C. for a period of time of at least about 0.1 hour; impregnating the calcined shaped particles with an amount of at least one decomposable nickel compound such as to provide the desired nickel content in the final absorbent composition; drying the thus-impregnated particles; and calcining (in air) the dried, impregnated particles at a temperature of about 600°–900° C. for a period of at least about 0.1 hour (so as to obtain the mixed oxide of Fe, Zn and Ni and the alumina binder).

In accordance with this invention, a process for removing hydrogen sulfide from a $H_2S$-containing feed gas comprises the step of contacting (preferably at about 350°–750° C.) the feed gas in a reactor with the above-described absorbent composition at such conditions as to obtain a product gas containing less $H_2S$ than the feed gas. In a preferred embodiment of this invention, the process comprises the additional steps of interrupting the contacting of the $H_2S$-containing feed gas with the above-described absorbent composition after it has absorbed $H_2S$, and heating this spent absorbent composition which has absorbed $H_2S$ with a free oxygen containing gas under such conditions as to substantially convert absorbed $H_2S$ and metal sulfides contained in the spent absorbent composition to sulfur oxide (particularly $SO_2$). The thus-regenerated absorbent composition can be re-employed in the above-described step of removing $H_2S$ from the feed gas. Preferably, the above-described $H_2S$-containing feed gas (more preferably a tail gas from a Claus reactor for desulfurizing natural gas) contains less than about 500 ppm of free hydrogen, (i.e., less than about 500 parts by weight of $H_2$ per one million parts by weight of the feed gas).

DETAILED DESCRIPTION OF THE INVENTION

The sorbent composition of this invention consists essentially of (i) a solid component (first solid phase) consisting essentially of a mixed oxide of iron (in the +3 oxidation state) zinc and nickel (in the +2 oxidation state) and (ii) alumina and/or silica as the binder component (second solid phase). The term "mixed oxide of iron, zinc and nickel", as used herein encompasses any solid compound consisting essentially of chemically combined nickel, zinc, iron and oxygen. This term, as used herein, includes, but is not limited to, nickel-zinc ferrite of the approximate general formula $Ni_xZn_yFe_2O_4$, wherein the numerical values of both x and y are smaller than 1 and the sum of x and y is 1 (i.e., $x<1$, $y<1$, $x+y=1$).

The relative amount of (i) exceeds about 20 weight-%, generally is at least about 30 weight-%, and preferably is about 70–99 weight-%. The relative amount of (ii) generally is at least about 1 weight-%, and preferably is about 1–30 weight-%. The preferred component (ii) is alumina (more preferably a hydrated alumina such as boehmite or pseudoboehmite). The preferred atomic ratio of Ni:Zn in component (i) of the absorbent composition of this invention is in the range of about 1:10 to about 1:1 (more preferably about 1:3), and the preferred atomic ratio of (Ni+Zn):Fe is in the range of about 0.9:2 to about 1.1:2 (more preferably about 1:2). The absorbent composition may contain insignificant amounts of separate solid phases of individual metal oxides (NiO and/or ZnO and/or $Fe_2O_3$), in particular $Fe_2O_3$ (generally present at a level of less than 2 weight-%), which have not been converted to the mixed metal oxide during the preparation of component (i) from ZnO, $Fe_2O_3$ and NiO. These minor amounts of iron oxide, and possibly also of NiO and/or ZnO, which have not been chemically combined in the mixed oxide are not expected to significantly affect the $H_2S$ absorption capacity and performance of the sorbent composition of this invention.

The above-described sorbent composition can be prepared by any suitable method. One method of preparation comprises dry-mixing (dry-blending) desired amounts of zinc oxide, iron oxide (preferably $Fe_2O_3$) and nickel oxide (at the above-recited atomic ratios), alumina powder and, optionally, a processing aid (such as cellulose gel or graphite); adding water and an acid (such as an aqueous solution of acetic acid) to the above-prepared dry mixture; and mixing the above solids and liquids at such conditions as to obtain a shapable (i.e. extrudable or pelletize) pasty mixture. This pasty mixture is then shaped by any suitable shaping means (such as pelletizing, tabletting, extruding, agglomerating and the like), preferably by extrusion in any equipment commonly used for this operation, followed by drying (generally at about 80°-120° C. for about 1-20 hours in air) and calcining (generally at about 600°-900° C. for about 0.2-5 hours in air).

Another, presently preferred, method of preparation comprises dry-blending zinc oxide (generally about 7-33 parts by weight ZnO), iron oxide (generally about 13-66 parts by weight $Fe_2O_3$) and alumina (generally about 1-80 parts by weight $Al_2O_3$); mixing the obtained dry blend with an aqueous acid solution (as described above) so as to obtain a shapable pasty mixture; followed by shaping the pasty mixture, drying the obtained shaped particles, and calcining them (at the above-described drying and calcining conditions); and then impregnating these calcined particles with a solution of at least one decomposable nickel compound (i.e., which can be decomposed to NiO when heated), such as nickel nitrate (preferred), nickel carboxylates (Ni acetate, etc.), nickel bicarbonate, nickel carbonate, nickel bisulfate, nickel sulfate, and hydrates thereof; followed by drying and calcining (at the above-described drying and calcining conditions).

The thus-prepared absorbent composition particles generally have a surface area (measured by the BET method of Brunauer, Emmett and Teller employing nitrogen) of about 15-25 $m^2/g$ and a pore volume (measured by toluene intrusion at atmospheric pressure) of about 0.15-0.28 cc/g. When the absorbent particles have been shaped by extrusion, they generally have a cylindrical shape, a particle length of about 3-5 mm and a particle diameter of about 1-3 mm.

In accordance with the present invention, the absorbing composition described above is utilized to selectively remove hydrogen sulfide from a feed gas which contains hydrogen sulfide. $H_2S$ can be present in the feed gas at any suitable concentration, and generally is present at a concentration in the range of about 1 ppm $H_2S$ (1 part by weight of $H_2S$ per million parts of feed gas) to about 20 weight-% $H_2S$, and preferably about 0.1-8 weight-% $H_2S$. Preferably, the feed gas contains less than about 500 ppm of free hydrogen. Once the absorbing composition of the present invention has been prepared, a feed gas stream containing hydrogen sulfide is contacted with the absorbing composition under suitable absorbing conditions so as to substantially reduce the concentration of hydrogen sulfide in the feed gas stream without significantly increasing the concentration of sulfur dioxide in the gas stream. It is believed that in the present $H_2S$ removal process, hydrogen sulfide is substantially absorbed by the absorbing composition so as to form sulfides of iron, zinc and nickel. However, some absorbed $H_2S$ may be present in an adsorbed or chemisorbed state. The above-expressed theories regarding chemical and physical phenomena which may occur in the $H_2S$ absorption process of this invention and the use of the terms "absorb", "absorbing", "absorption" or "absorbent", as used herein, are not intended to limit the scope of the present invention.

The absorption process of this invention is preferably carried out in cycles comprising an $H_2S$ absorption period and a period for the regeneration of the sulfided absorbing composition. The absorption period comprises contacting a gaseous feed stream which contains hydrogen sulfide (and preferably less than about 500 ppm of free hydrogen) with the absorbing composition to thereby selectively remove hydrogen sulfide from the gaseous stream. The absorbing composition becomes sulfide during the absorption period. When the absorbing composition becomes sulfided to the point that regeneration is desirable, preferably after it is nearly completely sulfided and has become ineffective as a $H_2S$ absorbent, a free oxygen containing gas (preferably air) is contacted with the absorbing composition at such conditions as to regenerate the absorbing composition and to convert the sulfur compounds contained therein (i.e., $H_2S$ and sulfides of Fe, Zn and Ni) to a sulfur oxide (preferably $SO_2$).

The absorption composition of the present invention can be utilized to remove hydrogen sulfide from any suitable gaseous stream. The hydrogen sulfide may be produced by the hydrodesulfurization of fluids which contain organic sulfur compounds, or may be originally present as hydrogen sulfide in the gaseous stream. Examples of such suitable gaseous streams include light hydrocarbons, such as methane, ethane, propane, and gases derived from such light hydrocarbons; natural gas; gases derived from petroleum products and products from extraction and/or liquefaction of coal and lignite; gases derived from tar sands and shale oil; coal-derived synthesis gas; gases such as nitrogen, carbon monoxide, carbon dioxide and mixtures thereof; steam; inert gases such as helium and argon; and product gas streams from other prior hydrogen sulfide removal processes (such as a Claus process for oxidatively converting $H_2S$ to elemental sulfur) that contain residual hydrogen sulfide due to the incomplete removal of hydrogen sulfide by the prior process. Gases that adversely affect the removal of hydrogen sulfide and which should be absent from the gaseous streams being processed are oxidizing agents, examples of which include molecular oxygen, air, the halogens, and the oxides of nitrogen.

Although the absorbing composition of the present invention is effective in the removal of hydrogen sulfide from all suitable gaseous streams, it is especially effective in the removal of hydrogen sulfide from gaseous streams that contain less than about 500 ppm of free hydrogen, wherein it is desirable not to promote the oxidation of the hydrogen sulfide contained in such gaseous streams to sulfur dioxide. Examples of such suitable gaseous streams include acid gas streams derived from methane, ethane, and natural gas; olefin streams; and product gas streams from other hydrogen sulfide removal processes (such as a tail gas from a Claus process reactor) that contain residual hydrogen sulfide due to the incomplete removal of hydrogen sulfide by the prior process.

The $H_2S$ removal process of this present invention can be carried out by means of any apparatus in which there is achieved an alternate contact of the absorbing composition with the gaseous feed stream and, thereafter, of the spent absorbing composition with a free oxygen containing gas which is utilized to regenerate the absorbing composition. The process is in no way limited to the use of a particular apparatus. The process of this invention can be carried out using a fixed bed of the absorbing composition, a fluidized bed of the absorbing composition, or a moving bed of the absorbing composition. Presently preferred is the use of a fixed bed of the absorbing composition.

In order to avoid any casual mixing of the gaseous feed stream containing hydrogen sulfide with the free oxygen containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid may be utilized. Presently preferred is a purge fluid flow rate in the range of about 800 GHSV to about 1200 GHSV. After the absorbent regeneration is complete, the reactor is again purged with an inert gas.

Any suitable temperature for the $H_2S$ absorption step of the process of this invention can be utilized. The temperature will generally be in the range of about 150° C. to about 750° C., and will preferably be in the range of about 300° C. to about 700° C. The pressure generally is in the range of about 0 psig to about 2000 psig. And the gas hourly space velocity (GHSV; cc gas/cc absorbent/hour) of the feed gas generally is about 10–10,000 (preferably about 250–2,500).

Any suitable process conditions in the regeneration period can be utilized to regenerate the spent absorbing composition from its sulfided form back to the original absorbing composition state. The regeneration temperature will generally be in the range of about 370° C. to about 815° C., and preferably is in the range of about 425° C. to about 600° C. The regeneration is continued until the exiting gas contains no or only insignificant amounts of $SO_2$, generally for a time period of about 1–20 hours. The pressure during the regeneration step is generally about atmospheric.

The following examples are presented to further illustrate the present invention and are not to be construed as unduly limiting the scope of this invention.

EXAMPLE I

This example illustrate absorbent materials which were tested for absorbing hydrogen sulfide from gases.

Absorbent A was a composition consisting essentially of zinc oxide, iron oxide and alumina. It was prepared by dry-blending 28 parts by weight of ZnO, 57 parts by weight of $Fe_2O_3$, 15 parts by weight of Catapal D alumina (provided by Vista Chemical Co., Houston, Tex.; surface area: 250–300 $m^2/g$) and 4 parts by weight of Avicel ® cellulose gel (a processing aid provided by FMC Corporation, Philadelphia, Pa.) for 15 minutes in a Sigma mixer. A mixture of 1.4 parts by weight of glacial acetic acid and 21 parts by weight of water was added to the above dry powder mixture within a period of 10 minutes, followed by further mixing for 15 minutes. The pasty mixture was extruded by means of a Bonnot extruder employing a ⅛" die. The extrudates were dried at 200° F. for about 3 hours, followed by heating from 200° F. to 1500° F. at a rate of 15° F./minute, and calcining in air for 1 hour at 1500° F. The Avicel ® cellulose was completely oxidized to gaseous products ($CO_2$, $H_2O$) during the calcining step. Absorbent A had an average crush strength (measured substantially in accordance with the procedure described in Example I of U.S. Pat. No. 5,077,261) of about 20 pounds per particle and a pore volume (measured by toluene intrusion at atmospheric pressure conditions) of about 0.22 cc/g.

Absorbent B was an absorbent material consisting essentially of zinc oxide, iron oxide, nickel oxide and alumina. Absorbent B was prepared by dry-blending 24.7 parts by weight of ZnO, 50.3 parts by weight of $Fe_2O_3$, 25 parts by weight of alumina and 4 parts by weight of Avicel ® for 15 minutes in a Sigma mixer. Then a mixture of 2.4 parts by weight of glacial acetic acid and 21.6 parts by weight of water was added in accordance with the procedure described for Absorbent A. The obtained pasty mixture was extruded, dried and calcined in accordance with the procedure described for Absorbent A. 45 g of the calcined extrudates were impregnated with a solution of 13.4 g $Ni(NO_3)_2.6-H_2O$ in 4.9 cc $H_2O$, followed by drying at 200° F. for 3 hours and calcining in air at 1175° F. for 2 hours in air. The average crush strength (measured as described above) of the calcined extrudates of Absorbent B was 16 pounds per particle, and the pore volume (measured as described above) was 0.25 cc/g. X-ray diffraction spectra revealed that Absorbent B consisted essentially of a continuous phase of a mixed oxide of zinc, iron and nickel, a binder phase of alumina, and small amounts of a separate phase of $Fe_2O_3$.

EXAMPLE II

This example illustrates the experimental procedure for the removal of hydrogen sulfide from gas streams containing less than about 500 ppm of free hydrogen by means of the two solid absorbent materials described in Example I.

The tests were carried out in a single reactor unit comprising a 20 mm O.D. quartz reactor and a 2 mm thermocouple well. The reactor, which was maintained at a pressure of about 1.7 psig, was operated in a fixed bed down flow mode using 10 grams of Absorbent A or B. Within the reactor, the absorbent was heated to the reaction temperature in a stream of nitrogen. When the desired temperature was attained, the nitrogen flow was stopped, and the flows of a simulated sulfur plant feed gas and, when used, of water vapor were started. The water vapor was generated by pumping water through a heated line that was connected to the top of the reactor. The absorption process was carried out at a reactor temperature in the range of about 800° F. to about 1200° F., and a gas hourly space velocity of 2050 cc/cc absorbent/hour. The composition of the simulated sulfur plant feed gas was as follows: 4.2 volume-% hydrogen sulfide, 40.0 volume-% carbon dioxide, and nitrogen as the balance.

The progress of the absorption was followed by measuring the concentration of hydrogen sulfide in the reactor effluent after the water vapor had been condensed and removed from the effluent. The concentration of hydrogen sulfide was measured with Draeger tubes that were suited to the concentration ranges encountered. Once the absorbents became fully sulfided, as evidenced by hydrogen sulfide breakthrough, the flow of the simulated sulfur plant gas to the reactor was halted and the reactor was purged with nitrogen for a period of about 45 minutes while being heated to a regeneration temperature of about 1100° F. The sulfided absorbent was then regenerated in a stream of air (flow rate: 200 cc/minute) for about 5 hours. Following regeneration, the reactor was again purged with nitrogen for about 40 minutes while being cooled back down to the reaction temperature of the absorption cycle. The nitrogen purge was then halted and the simulated sulfur plant gas was fed to the reactor to begin another absorption cycle. Pertinent test results are summarized in the table below.

TABLE

| Absorbent | $H_2S$ Absorption Temp. (°F.) | Wt. % S in Absorbent at $H_2S$ Breakthrough |
|---|---|---|
| A | 800 | 10.8 |
| ($ZnO/Fe_2O_3/Al_2O_3$) | 800 | 10.5 |
| | 1000 | 17.7 |
| | 1000 | 17.6 |
| | 1200 | 26.7 |
| | 1200 | 26.3 |
| B | 800 | 25.7 |
| ($NiO/ZnO/Fe_2O_3/Al_2O_3$) | 800 | 21.7 |
| | 1000 | 28.1 |
| | 1000 | 28.8 |
| | 1200 | 32.7 |
| | 1200 | 32.9 |

Test data in the above table clearly show that the absorbent composition of this invention, i.e., Absorbent B (containing 25.1 weight-% ZnO, 49.2 weight-% $Fe_2O_3$, 7.1 weight percent NiO and 18.6 weight percent $Al_2O_3$), absorbed considerably more $H_2S$ at comparable absorption conditions than Absorbent A (containing 29.1 weight-% ZnO, 59.2 weight-% $Fe_2O_3$ and 11.7 weight percent $Al_2O_3$). This result is most surprising, because Absorbent B contained more alumina (which does not absorb $H_2S$) than Absorbent A.

Reasonable variations, modifications and adaptations for various usages and conditions can be made within the scope of the disclosure and the appended claims, without departing from the scope of this invention.

That which is claimed is:

1. A process for preparing a composition of matter which consists essentially of component (i) a mixed oxide of iron, zinc and nickel at a level exceeding about 20 weight percent and component (ii) at least one inorganic binder selected from the group consisting of alumina and silica as the remainder, said process comprising the steps of:

dry blending zinc oxide, iron oxide and said at least one inorganic binder; mixing the obtained dry blend with an aqueous acid solution so as to obtain a shapable pasty mixture; shaping the obtained pasty mixture; drying the thus-obtained shaped particles; calcining the dried, shaped particles at a temperature of about 600°–900° C. for a period of time of at least 0.1 hour; impregnating the thus-obtained calcined particles with a solution of at least one decomposable nickel compound; drying the thus-impregnated particles; and calcining the dried, impregnated particles at a temperature of about 600°–900° C. for a period of time of at least 0.1 hour, so as to obtain said composition of matter; wherein an atomic ratio of (Ni+Zn):Fe in the range of about 0.9:2 to about 1.1:2 in said composition of matter is attained.

2. A process in accordance with claim 1, wherein said dry-blending is carried out with about 7–33 parts by weight of ZnO, about 13–66 parts by weight of $Fe_2O_3$ and about 1–80 parts by weight of said at least one inorganic binder.

3. A composition of matter obtained by the process of claim 2.

4. A process in accordance with claim 2, wherein the amount of said at least one decomposable nickel compound used for said impregnating is such as to attain an atomic ratio of Ni:Zn of about 1:10 to about 1:1 in said composition of matter.

5. A composition of matter obtained by the process of claim 4.

6. A process in accordance with claim 4, wherein said inorganic binder is alumina.

7. A process in accordance with claim 6, wherein the amount of alumina binder in said composition of matter is about 1–30 weight percent.

8. A composition of matter obtained by the process of claim 7.

9. A process in accordance with claim 6, wherein said at least one dissolved decomposable nickel compound is selected from the group consisting of nickel nitrate, nickel carboxylates, nickel bicarbonate, nickel carbonate, nickel bisulfate and nickel sulfate.

10. A process in accordance with claim 6, wherein said at least one decomposable nickel compound is nickel nitrate.

11. A process in accordance with claim 10, wherein the amount of alumina binder in said composition of matter is about 1–30 weight percent.

12. A process in accordance with claim 1, wherein cellulose gel is present as a processing aid during said dry-blending, and said aqueous acid solution is an acetic acid solution.

13. A process in accordance with claim 1, wherein said shaping is extrusion.

14. A composition of matter obtained by the process of claim 13.

15. A composition of matter in accordance with claim 14 having a cylindrical shape, a particle length of about 3–5 mm, a particle diameter of about 1–3 mm, a surface area of about 15–25 m²/g and a pore volume of about 0.15–0.28 cc/g.

16. A process in accordance with claim 1, wherein both drying steps are carried out for about 1–20 hours at a temperature of about 80°–120° C.

17. A process in accordance with claim 1, wherein both calcining steps are carried out in air for about 0.2–5 hours.

18. A composition of matter obtained by the process of claim 1.

* * * * *